United States Patent
Yoshimoto et al.

(10) Patent No.: US 6,547,051 B2
(45) Date of Patent: Apr. 15, 2003

(54) LOCK-UP CLUTCH OF FLUID TRANSMISSION DEVICE

(75) Inventors: Tokuji Yoshimoto, Shizuoka (JP); Tomohiko Tsuchiya, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 0 days.

(21) Appl. No.: 09/842,215

(22) Filed: Apr. 26, 2001

(65) Prior Publication Data

US 2002/0011392 A1 Jan. 31, 2002

(30) Foreign Application Priority Data

Apr. 27, 2000 (JP) ........................................ 2000-132901

(51) Int. Cl.[7] .............................................. F16H 45/02
(52) U.S. Cl. ..................... 192/3.29; 192/70.17; 192/212
(58) Field of Search ................................. 192/3.29, 3.3, 192/70.17, 212

(56) References Cited

U.S. PATENT DOCUMENTS

| | | | | |
|---|---|---|---|---|
| 2,737,824 A | * | 3/1956 | Livermore | 192/3.3 X |
| 3,185,273 A | * | 5/1965 | Smirl | 192/3.3 |
| 5,377,796 A | * | 1/1995 | Friedmann et al. | 192/3.29 |
| 5,590,750 A | * | 1/1997 | Graton et al. | 192/3.29 |
| 5,669,475 A | * | 9/1997 | Matsuoka | 192/3.29 |
| 5,690,200 A | * | 11/1997 | Jackel | 192/3.29 |
| 5,699,887 A | * | 12/1997 | Kundermann | 192/3.3 X |

FOREIGN PATENT DOCUMENTS

JP 7-4497 10/1995

* cited by examiner

*Primary Examiner*—Richard M. Lorence
(74) *Attorney, Agent, or Firm*—Arent Fox Kintner Plotkin & Kahn, PLLC (57) ABSTRACT

A lock-up clutch of a torque converter includes an annular clutch outer mounted in a side cover, a clutch inner connected to a turbine impeller, a driving friction plate axially movably connected to the clutch outer, first and second follower friction plates connected to the clutch inner for movement toward and away from each other with the driving friction plate interposed therebetween, an inner chamber defined between the first and second follower friction plates, and an outer chamber faced by outer sides of the first and second follower friction plates. When the inside of the outer chamber is put at a pressure higher than that in the inner chamber, the follower friction plates are brought into pressure contact with the driving friction plate, and an urging force on the follower friction plates is not applied to the side cover.

8 Claims, 8 Drawing Sheets

LOCK-UP CLUTCH OF FLUID TRANSMISSION DEVICE

BACKGROUND OF THE INVENTION

1. Field of the Invention

The present invention relates to a lock-up clutch of a fluid transmission device, which is mounted between a pump impeller and a turbine impeller and capable of connecting the pump impeller and the turbine impeller directly to each other.

2. Description of the Related Art

There is such a conventionally known lock-up clutch including a driving friction plate and a pair of follower friction plates sandwiching the driving friction plate, these driving and follower friction plates being disposed between a turbine impeller and a side cover connected to a pump impeller to cover the a back of the turbine impeller, wherein the lock-up clutch is brought into an engaged state by urging the friction plates all together against an inner wall of the side cover by a hydraulic pressure, as disclosed in Japanese Patent Application Laid-open No.7-4497.

The above known lock-up clutch has an advantage that a large torque capacity can be provided by using the plurality of friction plates. However, during connection, an urging force applied to all of the friction plates is received by the side cover and for this reason, it is necessary to form the side cover to have a high rigidity, for example, by increasing the thickness of the side cover. This is inconvenient for providing a reduction in weight of a fluid transmission device.

SUMMARY OF THE INVENTION

Accordingly, it is an object of the present invention to provide a lock-up clutch of a fluid transmission device, wherein a large torque capacity can be ensured, while enabling the connection without bearing the urging force applied to the friction plates by the side cover, thereby contributing to a reduction in thickness of the side cover and the like and in its turn, to a reduction in weight of the fluid transmission device.

To achieve the above object, according to a first aspect and feature of the present invention, there is provided a lock-up clutch of a fluid transmission device mounted between a pump impeller and a turbine impeller and capable of connecting the impellers directly to each other, comprising an annular clutch outer mounted in a side cover connected to the pump impeller to cover a back of the turbine impeller, a clutch inner disposed radially inside the clutch outer and connected to the turbine impeller, a driving friction plate axially movably connected to the clutch outer, first and second follower friction plates connected to the clutch inner for movement toward and away from each other with the driving friction plate interposed therebetween, an inner chamber defined between the first and second follower friction plates, and an outer chamber defined in the side cover and faced by outer sides of the first and second follower friction plates so that the inside of the inner chamber is put at a pressure higher than that in the outer chamber to bring the lock-up clutch into a disengaged state in which the follower friction plates are spaced apart from the driving friction plate, and the inside of the outer chamber is put at a pressure higher than that in the inner chamber to bring the lock-up clutch into an engaged state in which the follower friction plates are in pressure contact with the driving friction plate.

With the first feature, in the engaged state of the lock-up clutch, the pair of follower friction plates are brought into a pressure contact with the opposite sides of the driving friction plate by putting the inside of the outer chamber at the pressure higher than that in the inner chamber and hence, a large torque capacity can be provided. Moreover, any of the driving friction plate and the follower friction plates cannot be urged directly against the inner wall of the side cover and hence, the side cover need not be formed especially to have a high rigidity, and can be formed to have a small thickness to the utmost, thereby providing a reduction in weight in the fluid transmission device.

According to a second aspect and feature of the present invention, in addition to the first feature, the clutch outer formed separately from the side cover is secured to the side cover.

With the second feature, even when the clutch outer is formed to have a large thickness to increase the torque capacity thereof, the formation of the clutch outer can be carried out independent of the side cover, resulting in substantially no increase in weight of the torque converter T.

According to a third aspect and feature of the present invention, in addition to the second feature, the clutch outer is comprised of a plurality of sector members arranged circumferentially, each of the sector members being secured to the side cover.

With the third feature, the plurality of sector members forming the annular clutch outer can be fabricated at a good yield from a material such as a steel plate, whereby the clutch outer can be produced at a low cost.

According to a fourth aspect and feature of the present invention, in addition to any of the first to third features, the clutch outer comprises a pair of sidewalls axially opposed to each other, and a peripheral wall integrally connecting the sidewalls to each other on the side of an outer periphery, the clutch outer having a plurality of narrower portions and a plurality of wider portions, which are formed alternately thereon, the narrower portions having a smaller distance between the sidewalls, and the wider portions having a larger distance between the sidewalls, and transmitting claws projectingly provided on an outer periphery of the driving friction plate are axially movably disposed within the narrower portions, and damper springs are accommodated within the wider portions with their opposite ends resiliently engaged with end faces of the narrower portions and the transmitting claws.

With the fourth feature, the ends of the damper springs can be supported with a good stability by utilizing stepped portions between the narrower and wider portions, and the buffering transmission of the torque between the springs and the transmitting claws can be conducted reliably.

Yet further, according to a fifth aspect and feature of the present invention, in addition to any of the first to third features, the clutch inner is releasably engaged with the turbine impeller.

With the fifth feature, in assembling of the fluid transmission device, the lock-up clutch can be assembled to the side cover independent of the turbine impeller, and after assembling of the lock-up clutch, the turbine impeller need only be accommodated within the side cover, whereby it can be connected easily to the clutch inner, leading to an extremely good assemblability.

The above and other objects, features and advantages of the invention will become apparent from the following detailed description of the preferred embodiment with reference to the accompanying drawings.

DESCRIPTION OF THE PREFERRED EMBODIMENTS

The present invention will now be described by way of an embodiment with reference to the accompanying drawings.

Figure 1:
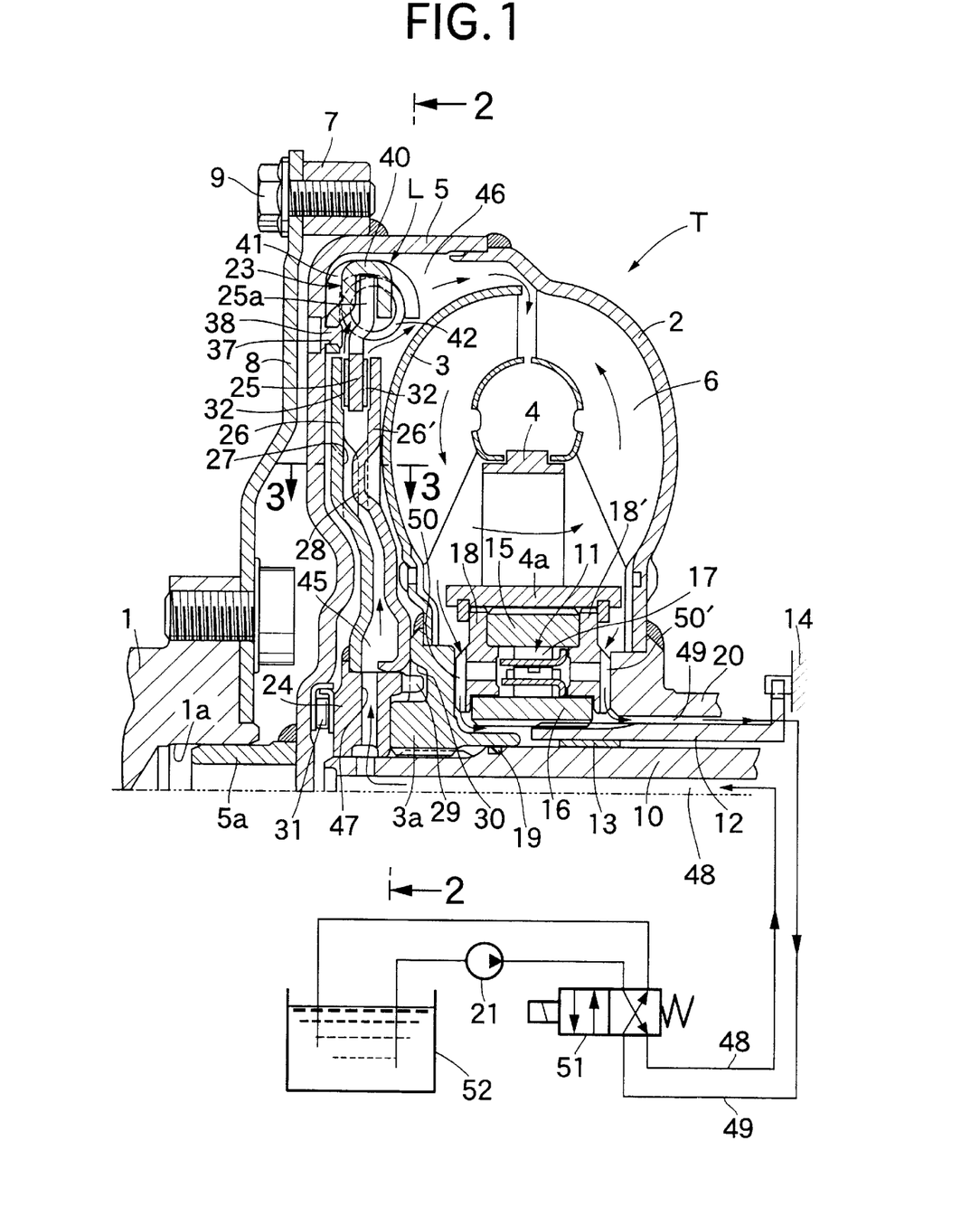
FIG. 1 is a vertical sectional view of a torque converter including a lock-up clutch according to the present invention.

Referring first to FIG. 1, a torque converter T as a fluid transmission device includes a pump impeller 2, a turbine impeller 3 mounted in an opposed relation to the pump impeller 2, and a stator impeller 4 disposed between inner peripheries of the pump and turbine impellers. A circulating circuit 6 for transmitting a power by a working oil is provided between the impellers 2, 3 and 4.

A side cover 5 is integrally connected by welding to the pump impeller 2 to cover an outer side of the turbine impeller 3. A support shaft 5a is fixedly mounted at a central portion of an outer surface of the side cover 5, and a connecting ring 7 is welded to an outer peripheral surface of the side cover 5. The support shaft 5a is fitted into a shaft bore 1a in a central portion of an end of a crankshaft 1 of an engine, and the connecting ring 7 is secured to a driving plate 8 coupled to the crankshaft 1 by bolts 9.

An output shaft 10 is disposed at a central portion of the torque converter T and arranged coaxially with the crankshaft 1, and a boss 3a of the turbine impeller 3 is spline-fitted over an outer periphery of the output shaft 10. The output shaft 10 is a main shaft of a multi-stage transmission (not shown).

A cylindrical stator shaft 12 is disposed around the outer periphery of the output shaft 10 to support a boss 4a of the stator impeller 4 through a free wheel 11. A bearing bush 13 is interposed between the output shaft 10 and the stator shaft 12 to permit the relative rotation between the output shaft 10 and the stator shaft 12. The stator shaft 12 is non-rotatably supported at its outer end on a transmission case 14.

The free wheel 11 is of a known type comprising an outer race 15 spline-fitted to an inner periphery of the boss 4a of the stator impeller 4, an inner race 16 spline-fitted over an outer periphery of the stator shaft 12, and a plurality of sprags 17 interposed in an annular arrangement between the races 15 and 16. The axial movements of the races 15 and 16 are restrained by a pair of side plates 18 and 18' spline-fitted to an inner peripheral surface of the boss 4a of the stator impeller 4.

An auxiliary driving shaft 20 coupled to the pump impeller 2 is disposed for relative rotation around the outer periphery of the stator shaft 12, so that an oil pump 21 for supplying the working oil to the torque converter T is driven by the auxiliary driving shaft 20.

A lock-up clutch L according to the present invention is mounted between the turbine impeller 3 and the side cover 5. The lock-up clutch L will be described in detail below.

Figure 2:
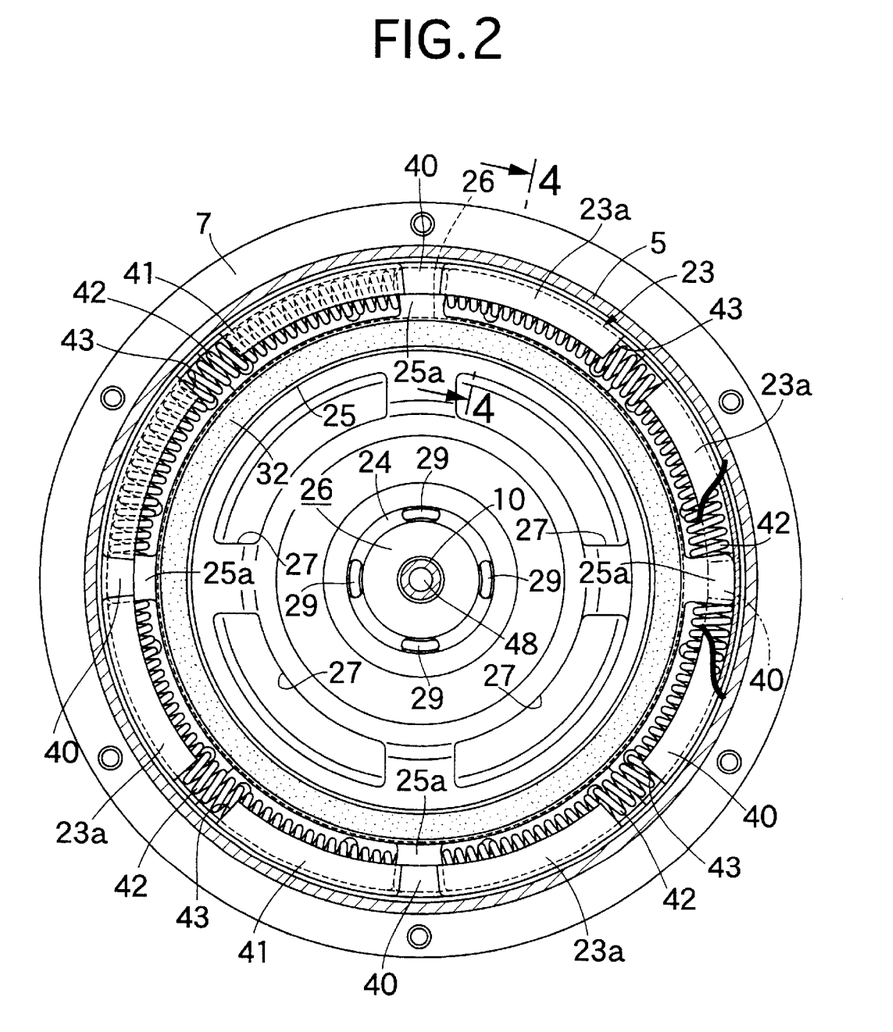
FIG. 2 is a sectional view taken along a line 2—2 in FIG. 1.
Figure 5:
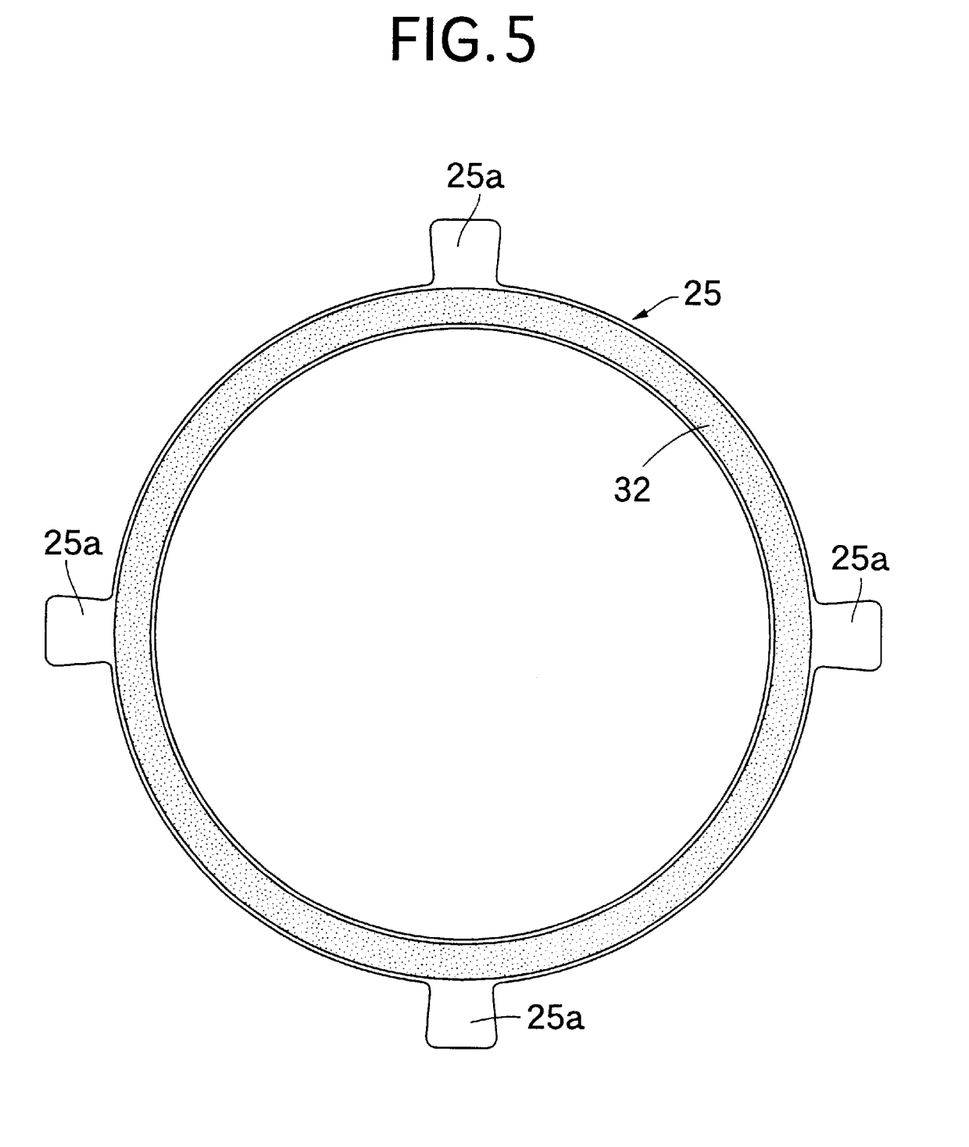
FIG. 5 is a side view of a driving friction plate of the lock-up clutch.
Figure 6:
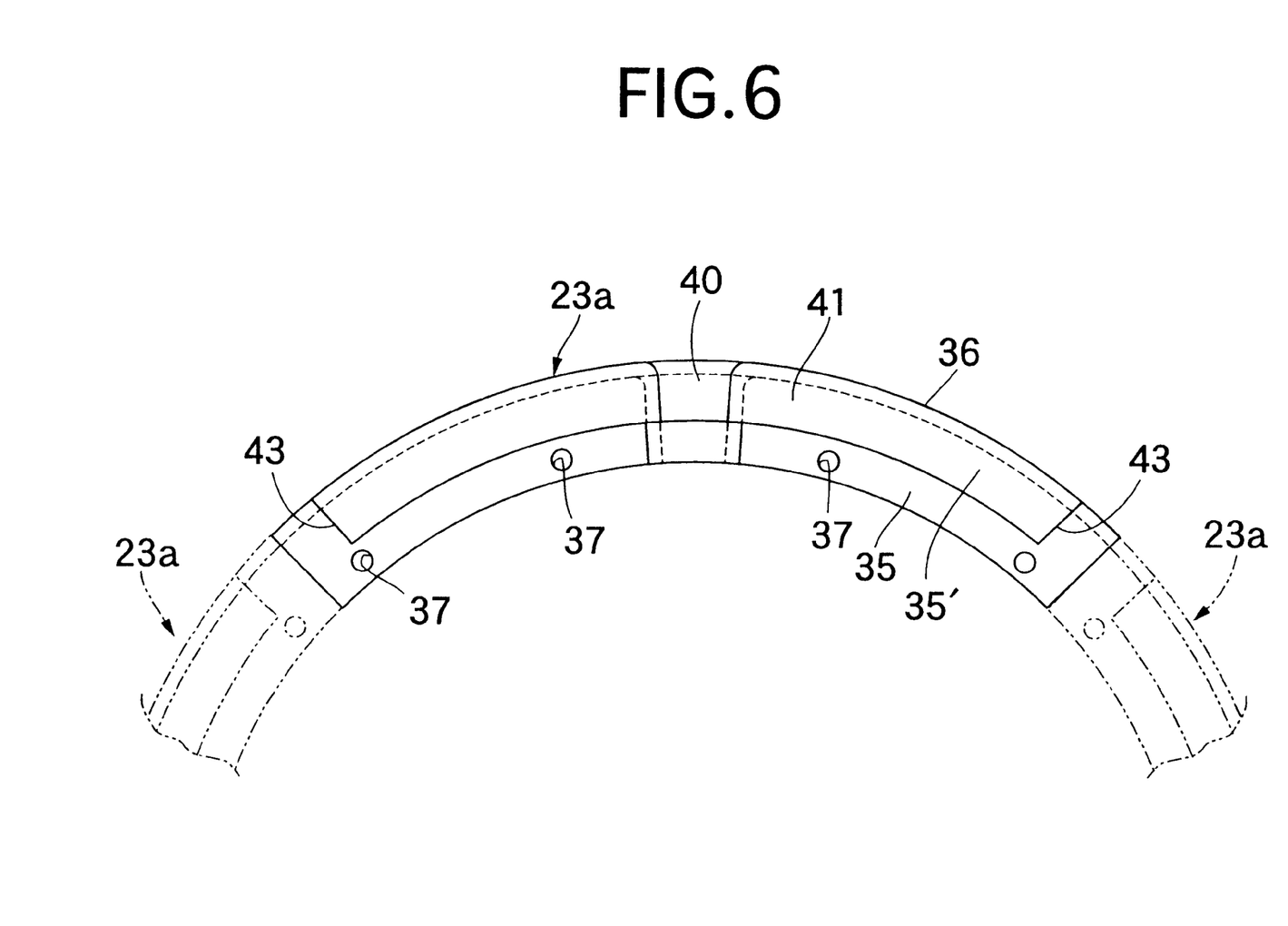
FIG. 6 is a side view of sector members forming a clutch outer of the lock-up clutch.
Figure 7:
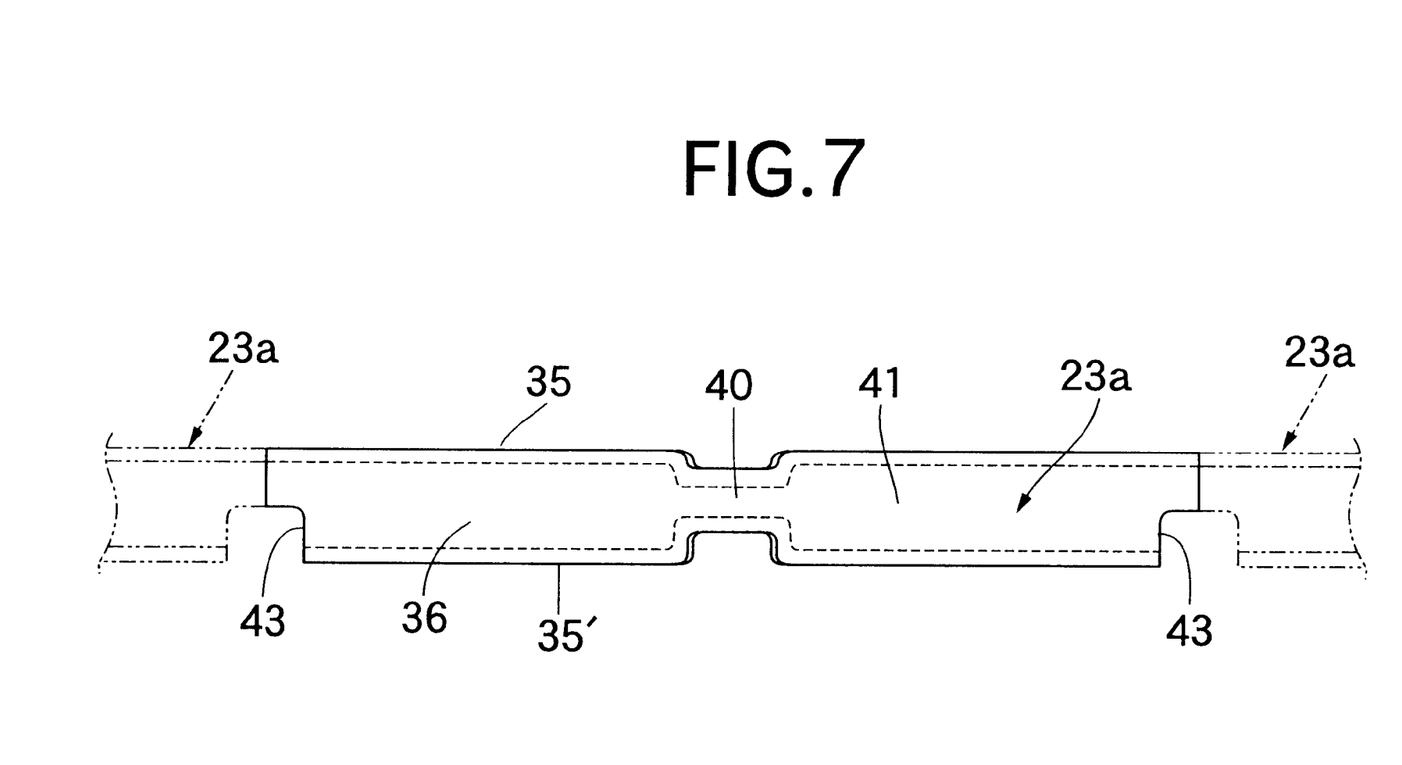
FIG. 7 is a plan view of the sector members.

Referring to FIGS. 1 and 2, the lock-up clutch L includes an annular clutch outer 23 secured to an inner peripheral wall of the side cover 5 in proximity to the inner peripheral wall, a clutch inner 24 carried for relative rotation on an outer peripheral surface of the output shaft 10 adjacent to the boss 3a of the turbine impeller 3, an annular driving friction plate 25 axially movably connected to the clutch outer 23, and a pair of first and second follower friction plates 26 and 26' carried on the clutch inner 24 so that they are opposed to each other with the driving friction plate 25 interposed therebetween. Friction linings 32, 32 are bonded to opposite sides of the driving friction plate 25 so that the follower friction plates 26 and 26' can come into pressure contact with the friction linings 32, 32 (see FIG. 5). The first follower friction plates 26 adjacent to an inner wall of the side cover 5 is connected to the clutch inner 24 by welding or the like, and the second follower friction plates 26' adjacent to the turbine impeller 3 is axially slidably carried on an outer peripheral surface of the clutch inner 24.

Figure 3:
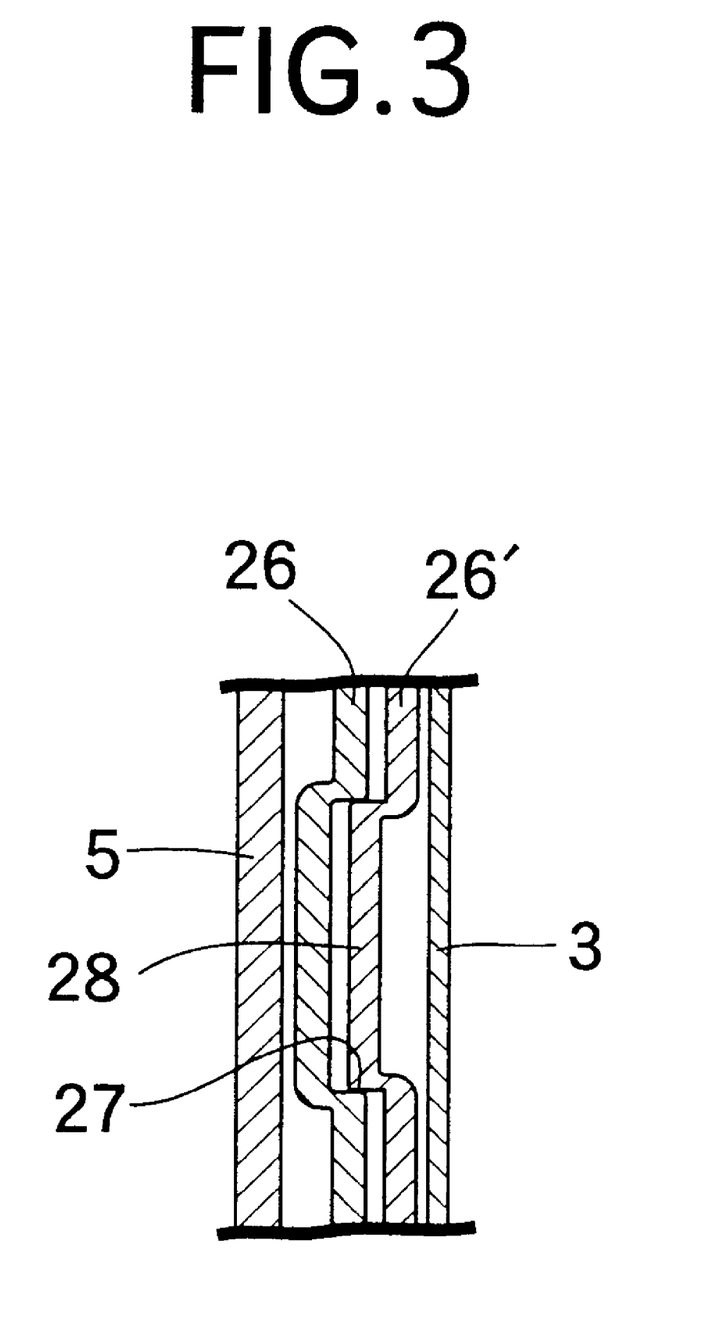
FIG. 3 is a sectional view taken along a line 3—3 in FIG. 1.

As shown in FIGS. 1 and 3, the follower friction plates 26 and 26' have a projection 27 and a recess 28 formed respectively on opposed surfaces thereof radially inside the driving friction plate 25 to engage each other for axially sliding movement, so that the engagement of the projection 27 and the recess 28 with each other enables the follower friction plates 26 and 26' to be rotated in unison with each other, while being moved toward and away from each other.

As shown in FIGS. 1 and 2, the clutch inner 24 and the boss 3a of the turbine impeller 3 have dog claws 29 and dog bores 30 formed respectively on and in opposed surfaces thereof to engage each other, so that the engagement of dog claws 29 and dog bores 30 with each other enables the clutch inner 24 and the boss 3a to be rotated in unison with each other, and the disengagement of dog claws 29 and dog bores 30 from each other enables the clutch inner 24 and the boss 3a to be separated from each other. One side of the clutch inner 24 is in abutment against the boss 3a, and the other side of the clutch inner 24 is in abutment against an inner wall of the side cover 5 with a thrust bearing 31 interposed therebetween, whereby the axial movement of the clutch inner 24 is inhibited.

Figure 4:
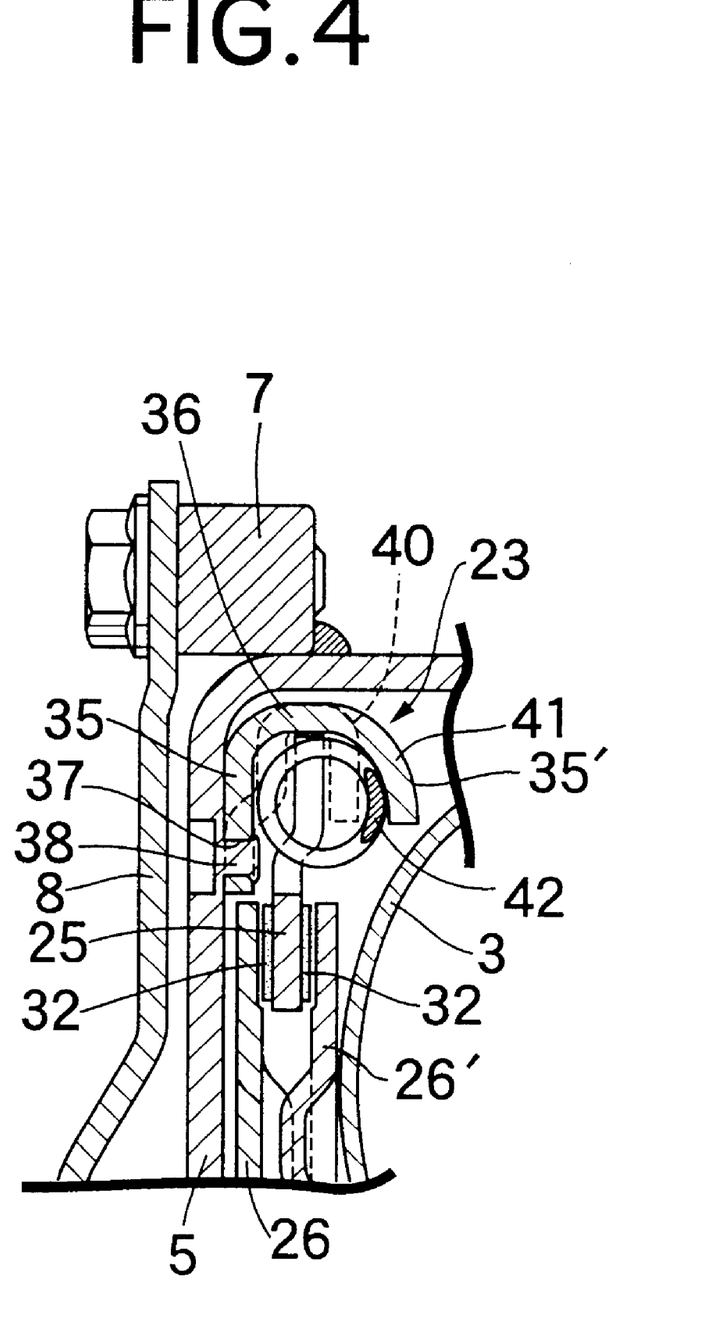
FIG. 4 is a sectional view taken along a line 4—4 in FIG. 2.

Referring to FIGS. 1, 2, 4, 6 and 7, the clutch outer 23 is comprised of a plurality of sector members 23a arranged annularly (particularly, see FIGS. 2 and 4). Each of the sector members 23a is formed from a steel plate by press forming, and comprised of a pair of sidewalls 35 and 35' axially opposed to each other, and a peripheral wall 36 integrally connecting the sidewalls 35 and 35' to each other on the side of an outer periphery thereof, so that the each of the sector members 23a has a U-shaped cross-section. A plurality of coupling bores 37 are provided in the sidewall 35 so that each of the sector members 23a is secured to the side cover 5 by fitting a plurality of coupling projections 38 provided on the inner wall of the side cover 5 into the coupling bores 37 and caulking the projections 38.

Formed alternately on the clutch outer 23 are a plurality of narrower portions 40 having a smaller distance between the sidewalls 35 and 35' and having a shorter peripheral length, and a plurality of wider portions 41 having a larger distance between the sidewalls 35 and 35' and having a longer peripheral length. A plurality of transmitting claws 25a (see FIG. 5) projectingly provided on an outer periphery of the driving friction plate 25 are axially movably disposed within the narrower portions 40. Damper springs 42 which are coil springs are accommodated within the wider portions 41 and resiliently engaged at their opposite ends with end faces of the narrower portions 40 and the transmitting claws 25a. In this manner, the driving friction plate 25 is connected to the clutch outer 23 through the damper springs in a rotating direction of the plate 25.

Cut-out portions 43 are provided at circumferentially central portions of the narrower portions, so that the transmitting claws 25a and the damper springs 42 are passed through the cut-out portions 43 and mounted within the clutch outer 23.

Referring again to FIG. 1, a space between the side cover 5 and the turbine impeller 3 is divided by the driving friction plate 25 and the follower friction plates 26 and 26' into an inner chamber 45 between the follower friction plates 26 and 26', and an or outer chamber 46 faced by outer sides of the follower friction plates 26 and 26'. The outer chamber 46 provides communication between the pump impeller 2 and the turbine impeller 3, and the inner chamber 45 communicates with a first oil passage 48 formed in a central portion of the output shaft 10 through a radial through-bore 47 in the clutch inner 24.

On the other hand, a second cylindrical oil passage 49 is defined between the stator shaft 12 and the auxiliary driving shaft 20, communicates with an inlet of the pump impeller 2 and an outlet of the turbine impeller 3 through spline grooves in an inner peripheral surface of the inner race 16 of the free wheel 11 and radial grooves 50 and 50' in outer sides of the side plates 18 and 18'.

A seal member 19 is interposed between fitted portions of the boss 3a of the turbine impeller 3 and the output shaft 10 for preventing a short-circuiting between the first and second oil passages 48 and 49.

The first and second oil passages 48 and 49 are adapted to be connected alternately to a discharge port of the oil pump 21 and an oil reservoir 52 through a lock-up control valve 51.

The operation of this embodiment will be described below.

In an idling or low-speed operation of the engine, the first oil passage 48 is connected to the discharge port of the oil pump 21, and the second oil passage 49 is connected to the oil reservoir 52 by the lock-up control valve 51, as shown in FIG. 1. When a rotational torque of the crankshaft 1 of the engine is transmitted through the driving plate 8, the side cover 5 and the pump impeller 2 to the auxiliary driving shaft 20, the oil pump 21 is driven, and the working oil discharged from the oil pump is passed through the lock-up control valve 51 via the first oil passage 48 and the through-bore 47 into the inner chamber 45, and then through between the driving friction plate 25 and the follower friction plates 26 and 26' into the outer chamber 46. During this time, the inside of the inner chamber 45 is put at a pressure higher than that in the outer chamber 46. As a result, a difference between such pressures causes the follower friction plates 26 and 26' to be opened away from friction linings 32 of the driving friction plate 25, and causes the lock-up clutch L to be brought into a turned-off state, thereby permitting the rotation of the pump impeller 2 and the turbine impeller 3 relative to each other.

The oil fed from the inner chamber 45 to the outer chamber 46 flows into the circulating circuit 6 through between the pump impeller 2 and the turbine impeller 3 to fill the circuit 6, and then flows through the radial grooves 50 and 50' in the side plates 18 and 18' of the free wheel 11 and the second oil passage 49 to return the oil reservoir 52.

When the rotation of the crankshaft 1 is transmitted to the pump impeller 2, the working oil filling the circulating circuit 6 is circulated through the pump impeller 2→turbine impeller 3→the stator impeller 4→the pump impeller 2 by the rotation of the pump impeller 2, and during this time, transmits the rotational torque of the pump impeller 2 to drive the output shaft 10. If there is a torque amplifying effect produced between the pump impeller 2 and the turbine impeller 3 at this time, a resulting reaction force is borne by the stator impeller 4, and the stator impeller 4 is fixed by a locking action of the free wheel 11.

When the torque amplifying effect is finished, the stator impeller 4 is rotated in the same direction together with the pump impeller 2 and the turbine impeller 3, while racing the free wheel 11 by the reverse rotation received by the stator impeller 4 in a direction of the torque.

Figure 8:
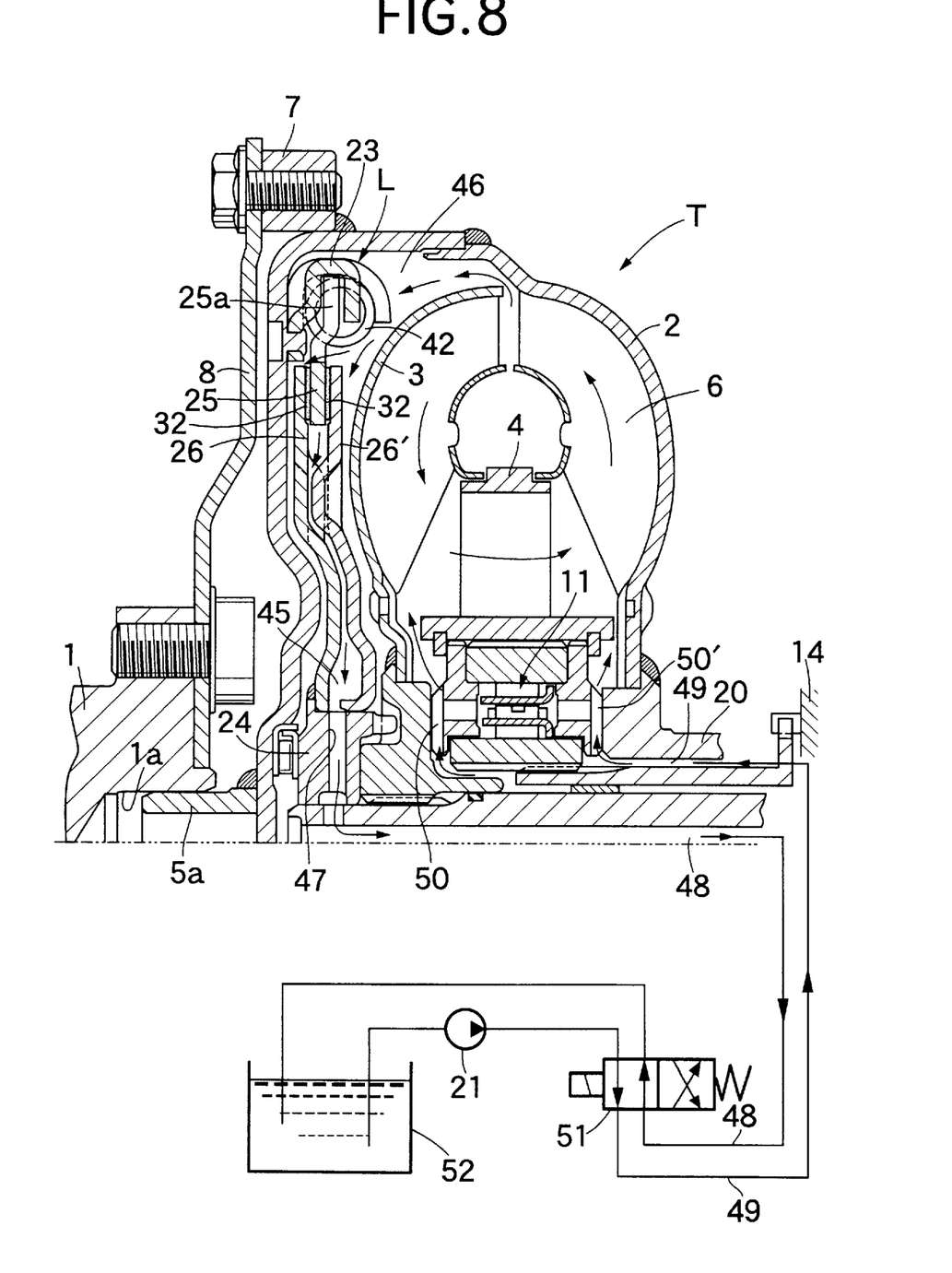
FIG. 8 is a vertical sectional view similar to FIG. 1, but showing an engaged state of the lock-up clutch.

When the torque converter T has been brought into such a coupling state, the lock-up control valve 51 is switched over to connect the second oil passage 49 to the discharge port of the oil pump 21 and to connect the first oil passage 48 to the oil reservoir 52, as shown in FIG. 8. As a result, the working oil discharged from the oil pump 21 flows in the reverse direction from the second oil passage 49 into the circulating circuit 6 to fill the circuit 6, and then flows into the outer chamber 46. On the other hand the inner chamber 45 is opened toward the oil reservoir 52 through the first oil passage 48 and hence, the inside of the outer chamber 46 can be put at a pressure higher than that in the inner chamber 45. As a result, a difference between such pressures causes the follower friction plates 26 and 26' to be urged to sandwich the driving friction plate 25 from opposite sides, whereby they are brought into pressure contact with the friction linings 32. Thus, the lock-up clutch L is brought into an engaged state.

Therefore, the rotational torque transmitted from the crankshaft 1 to the side cover 5 is mechanically transmitted to the output shaft 10 sequentially via the clutch outer 23, the damper springs 42, the transmitting claws 25a of the driving friction plate 25, the friction linings 32 of the driving friction plate 25, the first and second follower friction plates 26 and 26', the clutch inner 24 and the boss 3a of the turbine impeller 3. In this way, it is possible to eliminate the slipping between the pump impeller 2 and the turbine impeller 3 to enhance the transmitting efficiency.

When the follower friction plates 26 and 26' have been brought into pressure contact with the friction linings 32 of the driving friction plate 25, the amount of oil leaked from the outer chamber 46 through the such pressure-contact area into the inner chamber 45 is very small, and the difference in pressure between the two chambers 45 and 46 is ensured.

In such engaged state of the lock-up clutch L, the first and second follower friction plates 26 and 26' are in pressure contact and engagement with the opposite sides of the driving friction plate 25 and hence, a large torque capacity can be provided to the lock-up clutch L. Moreover, the driving friction plate 25 is axially movably connected to the clutch outer 23 secured to the side cover 5, and the first and second follower friction plates 26 and 26' are urged by the differential pressure between the two chambers 45 and 46 to sandwich the driving friction plate 25 from the opposite sides. Therefore, the friction plates 25, 26 and 26' cannot be urged against the inner wall of the side cover 5 and hence, the side cover 5 need not be formed especially to have a high rigidity, and can be formed to have a small wall thickness to the utmost, thereby providing a reduction in weight of the torque converter T.

Moreover, the clutch outer 23 is formed separately from the side cover 5 and hence, even when the clutch outer 23 is formed to have a large thickness to increase the torque capacity of thereof, the formation of the clutch outer 23 can be carried out independent of the side cover 5. In other words, it is sufficient to form only the clutch outer 23 to have a larger thickness, resulting in substantially no increase in weight of the torque converter T.

Further, the plurality of sector members 23a forming the annular clutch outer 23 can be fabricated at a good yield from a steel plate, thereby providing a reduction in manufacture cost of the clutch outer 23.

Yet further, the transmitting claws 25a of the driving friction plate 25 are axially movably disposed within the narrower portions 40 of the clutch outer 23, and the damper springs 42 are accommodated within the wider portions 41 with their opposite ends resiliently engaged with the end faces of the narrower portions 40 and the transmitting claws 25a. Therefore, the ends of the damper springs 42 can be supported with a good stability by utilizing the steps between the narrower portions 40 and the wider portions 41, and the buffering transmission of the torque between the springs 42 and the transmitting claws 25a can be conducted reliably.

In addition, the clutch inner 24 is releasably connected to the boss 3a of the turbine impeller 3 through the dog claws 29 and the dog bores 30 engaged with each other. Therefore, during assembling of the torque converter T, the lock-up clutch L can be assembled to the side cover 5 independent of the turbine impeller 3, and after assembling of the lock-up clutch L, the turbine impeller 3 need only be accommodated within the side cover 5, whereby the engagement between the dog claws 29 and the dog bores 30 can be achieved to easily connect the turbine impeller 3 to the clutch inner 24, leading to an extremely good assemblability.

Although the embodiment of the present invention has been described in detail, it will be understood that the present invention is not limited to the above-described embodiments, and various modifications in design may be made without departing from the spirit and scope of the invention. For example, the lock-up clutch L according to the present invention may be provided between a pump impeller and a turbine impeller which are fluid couplers.

What is claimed is:

1. A lock-up clutch of a fluid transmission device mounted between a pump impeller and a turbine impeller and capable of connecting said impellers directly to each other, comprising an annular clutch outer mounted in a side cover connected to the pump impeller to cover a back of a turbine impeller, a clutch inner disposed radially inside said clutch outer and connected to said turbine impeller, a driving friction plate axially movably connected to said clutch outer, first and second follower friction plates connected to said clutch inner for movement toward and away from each other with said driving friction plate interposed therebetween, an inner chamber defined between said first and second follower friction plates, and an outer chamber defined in said side cover and faced by outer sides of said first and second follower friction plates wherein the inside of said inner chamber is put at a pressure higher than that in said outer chamber to bring said lock-up clutch into a disengaged state in which said follower friction plates are spaced apart from said driving friction plate, and the inside of said outer chamber is put at a pressure higher than that in said inner chamber to bring said lock-up clutch into an engaged state in which said follower friction plates are in pressure contact with said driving friction plate, wherein said clutch outer comprises a pair of sidewalls axially opposed to each other, and a peripheral wall integrally connecting said sidewalls to each other on the side of an outer periphery, said clutch outer having a plurality of narrower portions and a plurality of wider portions, which are formed alternately thereon, said narrower portions having a smaller distance between said sidewalls, and said wider portions having a larger distance between said sidewalls, and transmitting claws projectingly provided on an outer periphery of said driving friction plate are axially movably disposed within said narrower portions, and damper springs are accommodated within said wider portions with their opposite ends resiliently engaged with end faces of said narrower portions and said transmitting claws.

2. A lock-up clutch of a fluid transmission device according to claim 1, wherein said clutch outer formed separately from said side cover is secured to said side cover.

3. A lock-up clutch of a fluid transmission device according to claim 2, wherein said clutch outer is comprised of a plurality of sector members arranged circumferentially, each of said sector members being secured to said side cover.

4. A lock-up clutch of a fluid transmission device according to any of claims 1 to 3, wherein said clutch inner is releasably engaged with said turbine impeller.

5. A lock-up clutch of a fluid transmission device mounted between a pump impeller and a turbine impeller and capable of connecting said impellers directly to each other, comprising an annular clutch outer mounted in a side cover connected to the pump impeller to cover a back of a turbine impeller, a clutch inner disposed radially inside said clutch outer and connected to said turbine impeller, a driving friction plate axially movably connected to said clutch outer, first and second follower friction plates connected to said clutch inner for movement toward and away from each other with said driving friction plate interposed therebetween, an inner chamber defined between said first and second follower friction plates, and an outer chamber defined in said side cover and faced by outer sides of said first and second follower friction plates wherein the inside of said inner chamber is put at a pressure higher than that in said outer chamber to bring said lock-up clutch into a disengaged state in which said follower friction plates are spaced apart from said driving friction plate, and the inside of said outer chamber is put at a pressure higher than that in said inner chamber to bring said lock-up clutch into an engaged state in which said follower friction plates are in pressure contact with said driving friction plate, wherein said clutch inner is releasably engaged with said turbine impeller.

6. A lock-up clutch of a fluid transmission device according to claim 5, wherein said clutch outer formed separately from said side cover is secured to said side cover.

7. A lock-up clutch of a fluid transmission device according to claim 6, wherein said clutch outer is comprised of a plurality of sector members arranged circumferentially, each of said sector members being secured to said side cover.

8. A lock-up clutch of a fluid transmission device according to any of claims 5 to 7, wherein said clutch outer comprises a pair of sidewalls axially opposed to each other, and a peripheral wall integrally connecting said sidewalls to each other on the side of an outer periphery, said clutch outer having a plurality of narrower portions and a plurality of wider portions, which are formed alternately thereon, said narrower portions having a smaller distance between said sidewalls, and said wider portions having a larger distance between said sidewalls, and transmitting claws projectingly provided on an outer periphery of said driving friction plate are axially movably disposed within said narrower portions, and damper springs are accommodated within said wider portions with their opposite ends resiliently engaged with end faces of said narrower portions and said transmitting claws.

* * * * *